(12) United States Patent
Lettau (10) Patent No.: US 10,247,542 B2
(45) Date of Patent: Apr. 2, 2019

(54) HANDHELD MEASURING AID WITH A 3-AXIS JOINT CONNECTION AND A SPHERICAL ENCODER

(71) Applicant: LEICA GEOSYSTEMS AG, Heerbrugg (CH)

(72) Inventor: Michael Lettau, Laufenburg (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 3 days.

(21) Appl. No.: 15/673,413

(22) Filed: Aug. 9, 2017

(65) Prior Publication Data

US 2017/0343336 A1 Nov. 30, 2017

(51) Int. Cl.
*G01B 11/14* (2006.01)
*G01D 5/26* (2006.01)
(Continued)

(52) U.S. Cl.
CPC ............ *G01B 11/14* (2013.01); *G01B 11/002* (2013.01); *G01C 15/06* (2013.01); *G01D 5/26* (2013.01)

(58) Field of Classification Search
CPC .... G02B 23/125; G02B 27/01; G02B 27/017; G02B 27/0172; G02B 27/1066; G02B 27/2235; G02B 5/122; G02B 5/124; G02B 15/14; G02B 17/061; G02B 21/0004; G02B 21/06; G02B 21/24; G02B 7/04; G02B 7/10; G02B 7/1822; G01N 2800/52; G01N 33/94; G01N 21/552; G01N 2223/419; G01N 22/00; G01N 22/04; G01N 2333/924; G01N 2333/978; G01N 23/046; G01N 27/041; G01N 33/15; G01N 33/20; G01N 33/57426; G01B 11/005; G01B 11/002; G01B 11/14; G01B 11/24; G01B 21/04; G01B 5/20; G01B 11/285; G01B 15/04; G01B 2003/1076; G01B 2003/1092; G01B 2003/1094; G01B 2003/1097;
(Continued)

(56) References Cited

U.S. PATENT DOCUMENTS 6,366,273 B1 * 4/2002 Rosenberg ............ G01B 5/008
345/156
7,295,947 B2 11/2007 Kurth et al.
(Continued)

FOREIGN PATENT DOCUMENTS

EP 0 553 266 A1 8/1993
WO 93/07443 A1 4/1993
(Continued)

*Primary Examiner* — Michael P Stafira
(74) *Attorney, Agent, or Firm* — Maschoff Brennan (57) ABSTRACT

The invention relates to a handheld measuring aid for use in a system having a station for determining the position and orientation of the measuring aid, the handheld measuring aid for surveying an object surface. The measuring aid has a body and visual markings disposed in a defined spatial relationship, forming a pattern, on the body in a marking region. In addition, the measuring aid has a connection for receiving a measuring, inspection or processing tool, wherein the connection has a joint, such that the tool is pivotable or rotatable in at least one direction. Furthermore, the connection or tool has a position encoder for determining the rotational position of the joint or tool.

13 Claims, 3 Drawing Sheets

(51) Int. Cl.
*G01C 15/06* (2006.01)
*G01B 11/00* (2006.01)

(58) Field of Classification Search
CPC .... G01B 21/042; G01B 2290/70; G01B 3/02; G01B 3/08; G01B 3/10; G01B 5/004; G01B 5/008; G01B 9/02; G01B 9/02038; G01B 9/02068; G01B 9/02075
See application file for complete search history.

(56) References Cited

U.S. PATENT DOCUMENTS

| | | | |
|---|---|---|---|
| 7,743,524 B2* | 6/2010 | Eaton | G01B 21/047 33/1 PT |
| 2014/0343890 A1* | 11/2014 | Lettau | G01C 15/002 702/150 |
| 2015/0043007 A1* | 2/2015 | Kwiatkowski | G01S 7/48 356/498 |
| 2016/0223316 A1* | 8/2016 | Jordil | G01B 11/005 |
| 2017/0108528 A1* | 4/2017 | Atlas | G01B 11/002 |

FOREIGN PATENT DOCUMENTS

| | | |
|---|---|---|
| WO | 97/14015 A1 | 4/1997 |
| WO | 2007/073272 A1 | 6/2007 |
| WO | 2007/124009 A2 | 11/2007 |
| WO | 2007/124010 A2 | 11/2007 |

* cited by examiner

HANDHELD MEASURING AID WITH A 3-AXIS JOINT CONNECTION AND A SPHERICAL ENCODER

FIELD OF THE INVENTION

The invention relates to a handheld measuring aid for use in a system—having a station for determining the position and orientation of the measuring aid—for surveying an object surface, wherein the measuring aid has a 3-axis joint connection such as a ball or Cardan joint and a spherical encoder for determining the joint orientation. In addition, the invention relates to a measuring probe of, or for, a handheld measuring aid, wherein the measuring probe has a joint.

BACKGROUND

Such industrial measuring systems, which are implemented for coordinate positioning of points on a surface, and are formed by a handheld measuring aid in cooperation with a station—such as, in particular, a 6-DoF laser tracker—surveying the measuring aid in space have long been known in the prior art.

Examples of such systems are, for example, described in the patent literature publications WO 1993/07443 A1, WO 1997/14015 A1, WO 2007/124009 A2, or WO 2007/124010 A2, or are also known in the form of the "AT901" laser tracker and "T-Probe" measuring aid products sold by Leica Geosystems AG.

One such handheld measuring aid instrument has, for this purpose, a measuring probe (stylus) for the object surface, which is disposed on a body of the measuring aid, in particular having a tactile ball for physically contacting a measuring point on the object surface (wherein notches, holes, hidden points, etc. should be understood herein as also forming part of the measuring object surface of a measuring object throughout).

Furthermore, instead of, or in addition to, a measuring probe, the measuring aid instrument may also have a handheld scanner equipped for short-range measurements for non-contact surface surveying, wherein the direction and position of the scanner measuring beam used for the short-range measurements are exactly known in relation to the light spots and reflectors disposed on the scanner. Such a scanner is, for example, described in EP 0 553 266 or is also known in the form of the "T-Scan" product sold by Leica Geosystems AG.

In addition, such a measuring aid instrument may also be equipped with further measuring or inspection tools, such as a tool for inspecting or surveying wells (wellbores), or with tools for processing workpieces, e.g. a drill, mill, punch, etc.

Furthermore, visual markings are present which are disposed, forming a pattern, on the body in a defined spatial relationship to one another and in relation to the measuring probe in a marking region. In particular, these visual markings may be provided by passive or active light spots able to be captured by a camera, wherein the markings are in particular formed by reflectors or by LEDs.

The measuring stations (such as laser trackers in particular) to be used together with the measuring aid may then be embodied, to capture these markings, with an optical image capturing unit having a two-dimensional, light-sensitive array, e.g., a CCD or CID camera or a camera based on a CMOS array (or having another pixel array sensor), and with an image processing unit. In particular, the camera may then be installed on the station such that the positions thereof in relation to one another are not variable. For example, the camera is installed on the station such that it is pivotable by a motor about one or about two axes, and can thus track the measuring aid also during movement so that it remains within the camera's field of vision.

A particular example of such measuring stations is the laser tracker with camera. Here, a target point, which is finely targetable and trackable, for such a laser tracker is formed by a retroreflective unit (e.g., a cubic prism or corner cube retroreflector), which is targeted using an optical laser measuring beam of the measuring device. The laser beam is reflected by the retroreflector in parallel back to the measuring device, the reflected beam being captured using a capturing unit of the device. Here, an emission or reception direction of the beam is identified, for example, by means of sensors for angle measurement which are associated with a deflection mirror or a targeting unit of the system. In addition, with the capturing of the beam, a distance from the measuring device to the retroreflector is identified, e.g., by interferometry or by means of runtime and/or phase difference measurement.

For cooperation of a measuring aid with a laser tracker, the measuring aid generally has a retroreflector at a central point of its marking region, which can be automatically targeted, tracked, and surveyed in position in three dimensions with high precision by the laser tracker.

For this purpose, laser trackers of the prior art generally have a tracking surface sensor in the form of a position-sensitive surface detector (such as a PSD or a CCD or CMOS sensor), wherein measuring laser radiation reflected on the target can be detected thereon and a corresponding output signal can be generated. By means of a downstream or integrated electronic system, the output signal can be analyzed and a focal point can be identified, for example. By means of this tracking and fine targeting sensor, a divergence of the point of incidence (focal point) of the captured beam from a servo-control zero point can thus be determined and, on the basis of the divergence, precise targeting or—in the event of movement—repositioning of the laser beam towards the retroreflector can be performed. Capture using the tracking and fine targeting sensor is performed coaxially to the measuring axis, so that the capturing direction corresponds to the measuring direction. The tracking and fine targeting can only be applied after the measuring laser has been at least roughly oriented towards a retroreflective target such that the measuring laser beam is incident on the retroreflector (considered at least somewhere within the beam cross section of the measuring laser beam). After precise targeting, angle and distance measurement is performed—as described above—for the actual surveying of the retroreflector.

The other three degrees of freedom of the measuring aid are determined by recording an image of the markings and corresponding image processing. In particular, the unit guiding the laser beam and the camera can then be formed such that their positions in relation to one another are not variable. For example, the camera is rotatable together with the unit about a substantially perpendicular axis, but is pivotable upwards and downwards independently of the guiding unit and is therefore disposed separately from the optics of the laser beam, in particular. Alternatively, the camera may also be embodied to be pivotable about one axis only. In a further alternative, however, the camera may also be integrally installed together with the beam-guiding unit in a rotatable and pivotable shared housing.

By capturing and analyzing the image—by means of image capturing and processing units—of the visual markings, the relative location of which to one another is known, the orientation of the measuring aid instrument in space may thus be concluded. Together with the determined spatial position of the retroreflector, the position and orientation of the measuring aid in space can therefore be precisely determined absolutely (or at least in relation to the laser tracker)—and therefore ultimately the surface point which is contacted in a tactile or optical manner by the probe of the measuring aid instrument.

As an alternative to the use of a laser tracker as a surveying station for the measuring aid, the station may also be designed such that six-degrees-of-freedom surveying of the measuring aid can also be performed in a solely camera-based manner, as is described in the above-mentioned patent literature publications WO 2007/124009 A2 or WO 2007/124010 A2.

Prior-art measuring aid instruments held in one hand are designed as two-sided in this respect, having a front side to be aligned towards the measuring station, on which the visual markings (and also optionally the retroreflector) are disposed in the marking region—all pointing in a joint direction (->facing perpendicularly away from the front side)—and a rear side, on which a grip handle is disposed to be gripped in an enclosing manner like a rod by a hand (also called a first grip) of a user.

The disadvantage of known measuring aid instruments is that their rigid design and dimensions, in particular length, which are too large for some object spaces, do not always allow to reach the surface or measuring point to be measured in an easily manageable manner or even at all. For example, some measuring points can only be contacted with the measuring ball disposed on the stylus by applying a hand position which is cumbersome for the user and/or using specifically designed holders (the separate use of which requires additional time), or some measuring points may not be contactable at all.

SUMMARY

Therefore, one object of some embodiments the invention is to provide a measuring aid for use in a system—having a station for determining the position and orientation of the measuring aid—for surveying an object surface, using which measuring aid work and surveying can be performed in an improved and/or simplified manner for the user.

This is achieved by implementing the characterizing features of the independent claim. Features which refine the invention in an alternative or advantageous manner can be inferred from the dependent patent claims.

The invention relates to a handheld measuring aid for use in a system—having a station for determining the position and orientation of the measuring aid—for surveying an object surface. The aid comprises a body, visual markings which are disposed in a defined spatial relationship, forming a pattern, on the body in a marking region, and a connection disposed on the body which is configured to receive a measuring, inspection or processing tool, e.g., a measuring probe, drill, mill, punch, well inspection tool or an optical scanner.

According to the invention, the connection has at least one joint to provide at least one, in particular at least two, rotational degrees of freedom with two coupling/connecting elements movable relative to each other (e.g. joint head and joint head receptacle), such that the (rotational) position or spatial orientation of one of the coupling elements to the other coupling element and thus to the body is variable in relation to at least one, in particular at least two, rotational axis. Furthermore, the connection has at least one position encoder, in particular a rotary encoder, so that the position of the pivotable coupling element and thus a mounted measuring tool relative to the body is able to be determined.

In an improvement, the connection is configured such that the position of one of the coupling elements in relation to the other coupling element and thus to the body is variable and able to be determined with respect to three rotational axes.

In a preferred improvement, the position encoder is configured as a spherical (position) encoder.

Optionally, the joint is configured as a ball joint or Cardan joint (Cardan suspension, universal joint).

In another option, the connection is configured for gradual variation and determination of orientation or for infinitely variable variation and determination of orientation.

Optionally, the body defines a rolling axis as the axis of the body which corresponds to the direction of the largest dimension, in particular, wherein the joint is configured such that the orientation of the measuring tool relative to the rolling axis is variable about a pitch and yaw angle of at least 30°, in particular at least 45°, especially at least 90°, and/or the measuring tool is rollable about 360°.

In a further improvement, the visual markings are implemented as passive or active light spots which are capable of being captured by a camera, in particular, wherein the markings are formed by reflectors or LEDs. Optionally, a retroreflector, in particular a hollow corner cube retroreflector, is disposed on the body in a defined spatial relationship relative to the pattern or the measuring probe, in particular in a center point of the pattern.

Optionally, the measuring aid has a first operating element actuatable by a user and an electronic circuit to generate a signal—as a function of an actuation of the first operating element—which is indicative of a triggering of a position and orientation determination of the measuring aid and determination of the position of the coupling elements relative to each other and thus the position of the measuring tool relative to the body of the measuring aid to be carried out by the station, and wireless communication means to transmit the signal to the station.

As a further option, the communication means are additionally configured to receive signals transmitted by the station, in particular, wherein the communication means have a receiving diode for this purpose for detecting measuring radiation emitted on the part of the station in the direction of the measuring aid, onto which the signals are modulated, especially wherein the receiving diode is disposed closely adjacent to the retroreflector or downstream of the retroreflector, which is implemented as partially transmissive for this purpose, in the measuring radiation propagation direction.

The subject-matter of the present invention also relates to a method for determining the position of a handheld measuring aid with a measuring tool according to any one of the previous claims, having a retroreflector and a plurality of target markings, and, in particular, for continuous tracking of the measuring aid using a laser tracker, wherein the target markings are disposed in a known fixed spatial distribution on the measuring aid and are configured to emit or reflect light beams, comprising aligning a beam-guiding unit of the laser tracker, which emits radiation, towards the measuring aid, emitting a radiation to the retroreflector to generate reflected radiation, receiving the reflected radiation with a sensor of a target acquisition unit, determining a point of incidence of the reflected measuring radiation on the sensor, generating an output signal to control a target tracking functionality based on the point of incidence, receiving the reflected radiation with a distance measuring unit, determining a distance to the retroreflector, determining a direction towards the retroreflector, and determining a spatial location of the measuring aid based on light beams of the target markings, wherein, according to the invention, determining the orientation of the measuring tool relative to the measuring aid and identifying the spatial position of a measuring point measured with the measuring tool are carried out based on the distance and direction towards the retroreflector, the spatial location of the measuring aid and the orientation of the measuring tool.

The invention further relates to system for surveying an object surface, comprising a measuring aid according to the invention and a station, e.g. a laser tracker, for determining the position and orientation of the measuring aid.

Optionally, the measuring aid of the system has a retroreflector, in particular a hollow corner cube retroreflector, on the body in a defined spatial relationship relative to the pattern or the measuring probe, and wherein the station is configured as a laser tracker for aligning a laser beam towards the retroreflector, wherein the laser tracker also has a camera to record an image of the pattern, and wherein the laser tracker has functionalities for three-dimensionally determining the position of the retroreflector via laser beam and for three-dimensionally determining the orientation of the measuring aid through analyzing the recorded image of the pattern.

The subject-matter of the present invention also relates to a measuring probe, configured for connection to a generic handheld measuring aid, wherein the measuring probe is divided into two parts by at least one joint to provide at least one, in particular at least two, especially three, rotational degrees of freedom with two connecting elements movable relative to each other (joint head and a joint head receptacle), so that the spatial orientation of one of the coupling elements to the other coupling element and thus of the two parts relative to each other is variable in relation to at least one rotational axis, and the measuring probe has at least one, in particular spherical, position encoder, so that the position of the connecting elements and thus the two parts relative to each other is able to be determined.

BRIEF DESCRIPTION OF THE DRAWINGS

In the following, the method and device of the invention will be described in greater detail by way of example only on the basis of specific exemplary embodiments which are schematically illustrated in the drawings, while further advantages of the invention will also be described. In detail.

DETAILED DESCRIPTION

Figure 1:
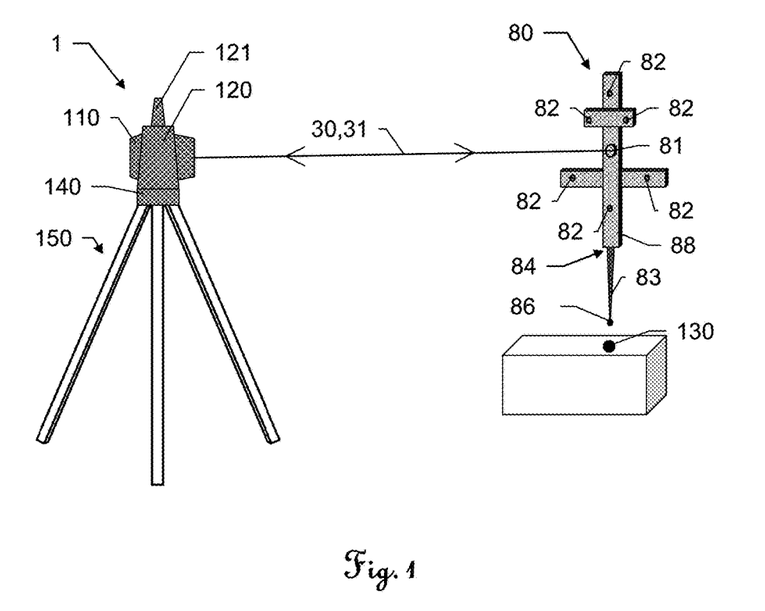
FIG. 1 shows an exemplary embodiment of a measuring system with a measuring aid instrument according to the invention.

FIG. 1 shows an exemplary embodiment of a system for surveying an object surface 130. The system comprises a laser tracker 1 with a basis 140, a support 120 attached thereto having a handle 121 and a beam-guiding unit 110 supported on two struts (not shown herein) of support 120. The shown laser tracker 1 is disposed on a tripod 150 and measures the distance to a retroreflector 81 located on a measuring aid oder measuring aid instrument 80 using a laser beam 30. Measuring aid instrument 80—here exemplified as being equipped with a measuring probe 83 as the measuring tool—further comprises a number of target markings 82, for example in the form of reflective or self-luminous light spots attached to the body 88 of measuring aid 80. This means, measuring aid 80 has a body 88 on which visual markings 82 are disposed in a marking region in a defined spatial relationship to each other, forming a pattern. By means of measuring probe or measuring head 83, a target point of a target object 130 to be surveyed can be surveyed (e.g. a stylus with a tactile ball disposed thereon for physically contacting a measuring point on the surface of object 130). Measuring tool 83 may be an integral part of measuring aid 80. However, preferably, measuring probe 83 is not fixedly attached to measuring aid 80 or does not form an integral part of measuring aid 80, but measuring aid 80 has a connection 84 described in detail below, using which a measuring tool, such as measuring probe 83, may be attached to measuring aid 80 in a modular or replaceable manner, so that various (measuring, inspection or processing) tools 83 can be connected to the measuring aid, e.g. measuring probes of various lengths or measuring probes with various scanning heads, tools for processing or manufacturing a workpiece such as drills, mills, punches or the like, or, instead of a measuring probe, a measuring or inspection tool for non-contact, preferably optical, surveying such as an optical scanner. Such a connection for receiving a measuring tool usually has mechanical and electrical connecting elements which enable, for example, automatic detection of the respective measuring tool 83.

To detect and track movements of measuring aid instrument such that laser beam 30 stays aligned towards retroreflector 81, laser tracker 1 has a target acquisition unit.

The target acquisition unit is preferably disposed in beam-guiding unit 110 and enables realigning the emitted laser beam 30 by capturing the orientation of laser beam 31 reflected by a target, in particular retroreflector 81. By realigning the laser beam, continuous tracking of measuring aid instrument 80 may be performed and the distance and position of the target point can be continuously determined relative to laser tracker 1.

In the arrangement shown, measuring laser beam 30 is aligned towards retroreflector 81 of measuring aid object 80 and is retroreflected thereon back to laser tracker 1. By means of this measuring laser beam 31, a distance to object 80 or to reflector 81 can be determined, in particular through runtime measurement, based on the phase measurement principle or based on the Fizeau principle. For this purpose, laser tracker 1 has a distance measuring unit (e.g., with an interferometer and absolute distance meter) and goniometers, which make it possible to determine a position of targeting unit 110, by means of which laser beam 30 can be aligned and guided in a defined manner, and therefore a propagation direction of laser beam 30.

Moreover, laser tracker 1 preferably has an image capturing unit. For the purpose of determining the position of a sensor exposure on a sensor or in a captured image, this image capturing unit may have a CMOS or is implemented in particular as a CCD camera or pixel sensor array camera. Such sensors allow position-sensitive detection of acquired exposure on the detector. In the example, measuring aid object 80 has a tactile sensor 83 or has such a sensor attached to it, the ruby ball 86 of which can be brought into contact with a target object surface to be surveyed. While this contact exists between scanning tool 83 and the measured object surface, a position of the contact point 86 in space and therefore the coordinates of scanned point 130 on the measured object surface can be exactly determined. This determination is performed by means of a defined relative positioning of contact point 86 towards reflector 81 and towards reference features 82 disposed on measuring aid object 80, which can be implemented as light-emitting diodes (LEDs), for example. Alternatively, reference features 82 may also be configured such that they reflect the incident radiation upon illumination, for example, using radiation of a defined wavelength (e.g., reflectively implemented markings), in particular displaying a specific luminescence characteristic, or they have a defined pattern or color coding. Thus, an orientation of scanning tool 80 can be determined from the location or distribution of the light spots generated by reference features 82 in an image captured using a sensor of the image capturing unit.

The captured image of measuring aid object 80 or the provided light spots of object 80 are therefore used as the basis for determining the orientation. For, in particular focused, capturing of LEDs 82 using an optimum and known image scale, laser tracker 1 may have vario-zoom optics, i.e., two optical assemblies (e.g., lenses) positionable independently of one another in relation to the image capturing sensor.

For this final orientation determination, laser tracker 1 also has a special image recording and analysis functionality, which is executable by a control and processing unit of tracker 1. In the scope of this embodiment, an image of reference features 82 of measuring aid instrument 80 is captured and the orientation or alignment of measuring aid object 80 is derived based on image positions for the light spots captured in the image by means of image processing. Here, the camera is aligned such that an image may be captured in the direction of measuring aid 80 targeted by means of laser beam 31.

Of course, alternative methods or devices may also be used to determine the location or orientation of measuring aid 80, such as those determining its location or orientation using measuring beam 30 or 31 or by means of tilt sensors of measuring aid 80.

Figure 2A:
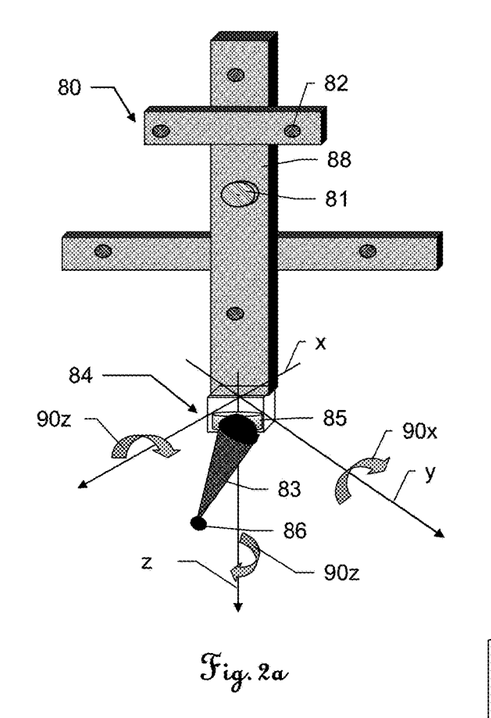
FIG. 2a shows a first embodiment of a measuring aid instrument according to the invention.

FIG. 2a shows a first embodiment of a measuring aid 80 according to the invention. The mounted measuring tool—in the example, a measuring probe 83 with a scanning head 86, e.g. a ruby ball—is connected to measuring aid 80 by a connection having a joint 84. By means of joint 84, measuring tool 83 is attached to measuring aid 80 rotatably (arrows 90x, 90y, and 90z) about an axis (preferably the x- and/or y-axis) (preferably, variability of the pitch and/or yaw angle is provided, the longitudinal axis of measuring aid 80 being considered as the rolling axis z). For example, through joint 84, measuring probe 83 is pivotable or rotatable by at least 45° or 90° or more about at least one axis. If joint 84 is configured to rotate about the z-axis (rolling axis), a rotation about 360° (full circle) is preferably provided. Joint 84 is, for example, an articulated joint, a ball joint or a Cardan joint. Preferably, joint 84 or the connecting or coupling elements are made of a low-friction or frictionless material or coated with corresponding materials. Furthermore, joint 84 or the connection is configured such that data communication between measuring aid 80 and measuring tool 83 is possible, for which purpose joint 84 or the connection provides electrical or optical connections. Instead of the connection or measuring aid 80 completely providing joint 84, it is, of course, also possible that only one joint part is attached to measuring aid 80 and the second joint part to measuring tool 83, so that the connection between measuring tool 83 and measuring aid 80 is established by joint 84 or joint 84 serves as the connection.

To determine the position or spatial alignment or orientation of measuring tool 83 relative to measuring aid 80, measuring aid 80 or the connection also has a position or location encoder or position or location transducer 85. By means of position sensor 85, the relative position of the two connection elements movable relative to each other (e.g., joint head and joint socket) is determined in relation to one another and thus of the movable element relative to body 88 of measuring aid 80. As such, the position of measuring tool 83 (relative to measuring aid 80) will then also be known.

In other words, measuring aid 80 has a sensor using which the spatial relationship of the movable joint part and thus measuring tool 83 relative to body 88 or the light pattern of markings 82 is able to be determined or, put in another way, to provide the defined relative positioning of contact point 86 towards reflector 81 and towards reference features 82 disposed on measuring aid object 80 as mentioned in FIG. 1.

If measuring tool 83 is only rotatable about one axis, position encoder 85 is configured as an angular encoder, in the event of rotatability about two axes, position encoder 85 is configured as a two-axis rotary encoder or angular encoder, or the connection has two angular encoders or rotary encoders. Position encoder 85 then performs either incremental or, preferably, absolute measurements. As an option, measuring aid 80, or the system comprising the laser tracker and measuring aid, has a calibrating function by which position encoder 85 is calibratable. The change in joint position or the determination of the position or orientation may either be done gradually or continuously.

Alternatively, measuring tool 83 is rotatable about all three axes, x, y, z (the roll, pitch and yaw angles are variable), in particular if measuring probe 83 or scanning head 86 are not configured rotationally symmetrically, which is the case with scanning heads 86 for surveying object edges, for example. Then, the connection for determining the relative position of measuring probe 83 has three rotary encoders for all three axes or a 3-disk encoder. In a preferred alternative, position encoder 85 is configured as a spherical encoder or spherical transducer. Such spherical encoders which are capable of measuring all three rotational axes, are generally known in the art and may be based on optical, capacitive or inductive modes of action, for example. Optical spherical encoders are, for example, described in U.S. Pat. No. 7,295,947 BB, U.S. Pat. No. 7,743,524 B or WO 7073272 A1, wherein a defined, graphical reference pattern applied to a ball is captured by one or more optical sensors (cameras) movable relative to the ball. From the captured image(s) and the pattern (sections) contained therein, the relative position of the ball is derived, for example, by comparison to stored reference pattern sections.

Advantageously, as an option, a first operating element (such as a pushable operating button) actuatable by a user is present on the body. Upon actuation, a signal is generated by an electronic circuit, which is indicative of a triggering of a position and orientation determination of the measuring aid able to be carried out by the surveying station, and of a determination of the position of the joint or the orientation or alignment of measuring tool 83. In addition, wireless communication means are provided for transmitting the signal to the station (e.g. laser tracker 1 from FIG. 1). For example, in the case of active light spots (i.e., for example, LEDs—light-emitting diodes) used as markings, these can be formed by the LEDs as a second function thereof (coded flashing pattern received and decoded on the part of the station). Alternatively, a separate IR transmitting diode (not shown herein) may be provided especially for this purpose, so that the signals transmitted thereby can be received on the part of the station using an IR receiver (e.g., similar in principle to the IR remote control technology for televisions).

Figure 2B:
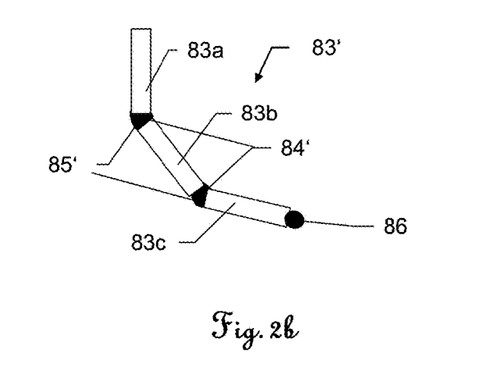
FIG. 2b shows an example of a measuring probe according to the invention.

FIG. 2b shows a measuring probe 83' according to the invention which enables further flexibility in the handling of a measuring aid instrument for the user. Measuring probe 83' is not rigid in itself, but has at least one joint 84', in the example, two joints 84', which connect (in the example, three) parts 83a, 83b, and 83c of measuring probe 83'. By means of part 83a, measuring probe 83' is attachable to the measuring aid, while measuring ball 86 is disposed on part 83c. Part 83b connects these two parts 83a and 83c as an intermediate piece. Furthermore, measuring probe 83' has position encoders 85' on joints 84', so that the relative positions of parts 83a, 83b, and 83c with respect to each other are measurable. Measuring probe 83' is configured such that the measured values of position encoders 85' are transmittable to the measuring aid or an analyzing unit of the measuring system, e.g. by means of an electrical or optical connection to the measuring aid or by known wireless transmission methods. In particular if joints 84' enable rotation about all three axes (which is, for example, measured by spherical encoders 85'), the user can thus contact measuring points of an object surface even better which are difficult or impossible to reach using conventional measuring aids or measuring probes. Of course, such a measuring probe 83' is also combinable with a measuring aid, or able to be integrated therein, which does not have a joint connection, but where the probe is rigidly coupled or integrated.

Figure 3:
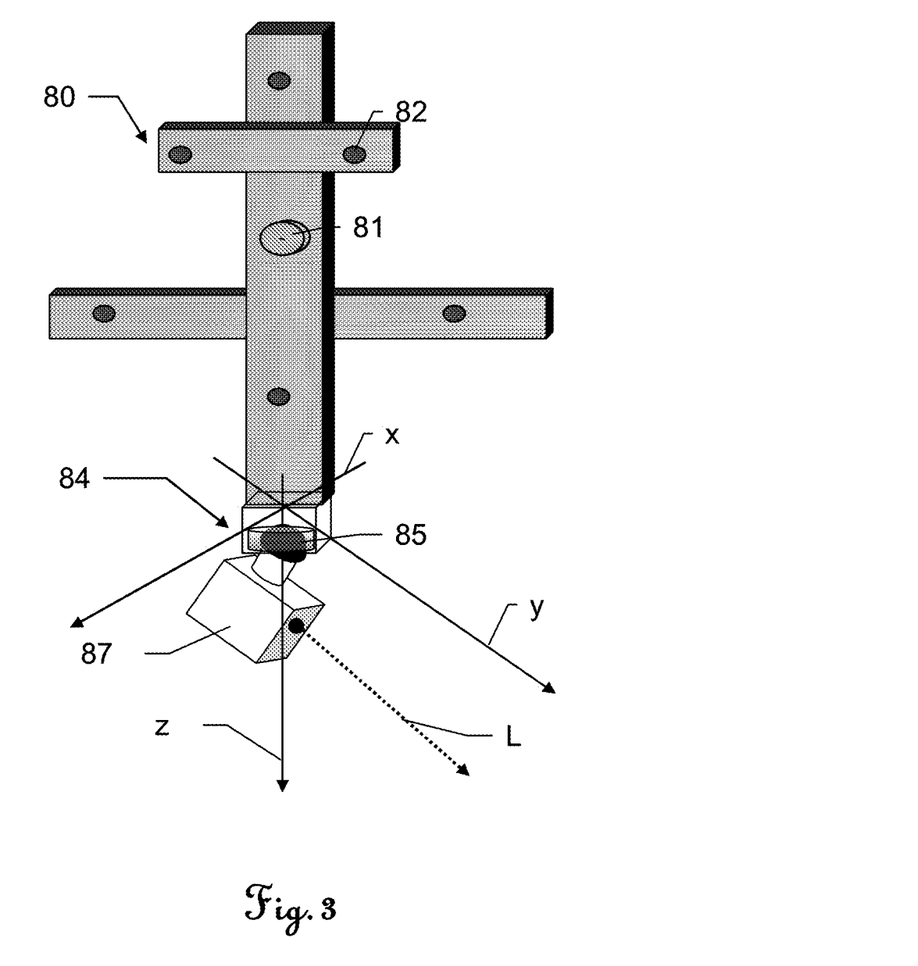
FIG. 3 shows a second embodiment of a measuring aid instrument according to the invention.

FIG. 3 shows another embodiment of a measuring aid 80 according to the invention or another example of its use. In the example, measuring aid instrument 80 has an optical scanner 87, or such an optical scanner 87 is attached to measuring aid instrument 80. Such optical scanners are generally known in the art and are, for example, configured as laser scanners which emit laser radiation L onto the object to be surveyed or the object surface and detect radiation reflected by the surface (e.g. based on a runtime method) and generate position information, e.g. a 3D point cloud, therefrom. It is understood that, as an alternative to an optical scanner, e.g. acoustic scanners are also possible as a measuring tool.

Scanner 87 is mounted to measuring aid instrument 80 by means of a connection which, as in the example shown in FIG. 2a, has a joint 84, so that scanner 87 is rotatable about one, two, or three axes. If measuring aid 80 is configured for receiving a scanner 87 like in the example, rotatability about the z-axis (rolling axis) is particularly advantageous as the targeting of laser beam L emitted by scanner 87 is thus easily variable. Furthermore, measuring aid instrument 80 or the connection has a position encoder, preferably a spherical encoder, by which the respective joint position may be measured, so that the orientation of scanner 87 and thus the targeting of laser beam L are defined or known, so that, from the position and orientation of measuring aid 80 known through measurement using the laser tracker, the location information of scanner 87 and the measured value of the laser beam measurement, the position of a measuring point of the object surface is clearly identifiable.

It should be understood that these shown figures only schematically illustrate possible exemplary embodiments. The various approaches may also be combined with each other and with devices or methods known in the art.

What is claimed is:

1. A handheld measuring aid for use in a system including a station for determining the position and orientation of the handheld measuring aid for surveying an object surface, the handheld measuring aid comprising:
   a body;
   a plurality of visual markings, disposed in a defined spatial relationship, forming a pattern, on the body in a marking region; and
   a connection disposed on the body, which is configured to receive a measuring, inspection or processing tool,
   wherein the connection has at least one joint to provide three rotational degrees of freedom with two connecting elements movable relative to each other, so that the position of one of the connecting elements in relation to the other connecting element and thus in relation to the body is variable with respect to three rotational axes, and the connection has at least one spherical position encoder, so that the rotational position of the movable connecting element with respect to the three rotational axes and thus of the measuring tool relative to the body is able to be determined.

2. The measuring aid according to claim 1, wherein the connection is configured for gradual variation and determination of orientation.

3. The measuring aid according to claim 1, wherein the connection is configured for infinitely variable variation and determination of orientation.

4. The measuring aid according to claim 1, wherein a rolling axis is defined through the body as the axis of the body which corresponds to the direction of the largest dimension.

5. The measuring aid according to claim 4, wherein the joint is configured such that:
   the orientation of the measuring tool relative to the rolling axis is variable about a pitch and yaw angle of at least 30°, or
   the measuring tool is rollable about 360°.

6. The measuring aid according to claim 1, wherein the visual markings are implemented as passive or active light spots capable of being captured by a camera.

7. The measuring aid according to claim 6, wherein the markings comprise reflectors or LEDs.

8. The measuring aid according to claim 6, further comprising:
   a retroreflector disposed on the body in a defined spatial relationship relative to the pattern or the measuring probe.

9. The measuring aid according claim 1, wherein the measuring aid comprises:
   a first operating element actuatable by a user and an electronic circuit to generate a signal as a function of an actuation of the first operating element which is indicative of a triggering of a position and orientation determination of the measuring aid and determine the position of the coupling elements relative to each other and thus the position of the measuring tool relative to the body of the measuring aid to be carried out by the station, and
   a wireless communication means to transmit the signal to the station.

10. The measuring aid according to claim 9, the communication means are additionally configured to receive signals transmitted by the station.

11. The measuring aid according to claim 10, wherein the communication means comprises a receiving diode for reception for detecting measuring radiation emitted on the part of the station in the direction of the measuring aid, onto which the signals are modulated.

12. A system for surveying an object surface, comprising a measuring aid according to claim 1 and a station for determining the position and orientation of the measuring aid.

13. The system according to claim 12, wherein the measuring aid has a retroreflector on the body in a defined spatial relationship relative to the pattern or the measuring probe, and wherein the station is configured as a laser tracker for aligning a laser beam towards the retroreflector, wherein the laser tracker also has a camera to record an image of the pattern, and wherein the laser tracker has functionalities for three-dimensionally determining the position of the retroreflector via laser beam and for three-dimensionally determining the orientation of the measuring aid through analyzing the recorded image of the pattern.

* * * * *